US009673608B2

(12) United States Patent
Gautier et al.

(10) Patent No.: US 9,673,608 B2
(45) Date of Patent: Jun. 6, 2017

(54) DISCONNECTION INDICATOR OF AN ACTIVE COMPONENT OF A DEVICE FOR PROTECTING AN ELECTRICAL INSTALLATION

(71) Applicant: ABB FRANCE, Cergy Saint Christophe (FR)

(72) Inventors: Boris Gautier, Lourdes (FR); Stephane Brescon, Bagneres de Bigorre (FR)

(73) Assignee: ABB FRANCE, Cergy Saint Christophe (FR)

( * ) Notice: Subject to any disclaimer, the term of this patent is extended or adjusted under 35 U.S.C. 154(b) by 163 days.

(21) Appl. No.: 14/746,765

(22) Filed: Jun. 22, 2015

(65) Prior Publication Data

US 2015/0372472 A1 Dec. 24, 2015

(30) Foreign Application Priority Data

Jun. 20, 2014 (FR) ...................................... 14 55681

(51) Int. Cl.
*H02H 3/08* (2006.01)
*H02H 3/04* (2006.01)
(Continued)

(52) U.S. Cl.
CPC ............... *H02H 3/04* (2013.01); *H01C 7/126* (2013.01); *H01H 37/08* (2013.01);
(Continued)

(58) Field of Classification Search
CPC ........ H02H 3/006; H02H 3/08; H02H 1/0015; H02H 9/04; H02H 9/041; H02M 1/32
(Continued)

(56) References Cited

U.S. PATENT DOCUMENTS 5,164,559 A * 11/1992 Pham .................... H01H 33/161
218/143
2011/0163836 A1* 7/2011 Darr ......................... H01H 1/20
337/143

(Continued)

FOREIGN PATENT DOCUMENTS

CN 101834434 A 9/2010
WO 2008010410 A1 1/2008

*Primary Examiner* — Dharti Patel
(74) *Attorney, Agent, or Firm* — Cantor Colburn LLP

(57) ABSTRACT

A device for protecting an electrical installation including an insulating body electrically defining an internal housing, the protective device including, within the internal housing: an active component of a device for protecting an electrical installation; a disconnection system for disconnecting the active component moveable between a contact position corresponding to a connected state of the active component and an open position corresponding to a disconnected state of the active component; a disconnection indicator, where the disconnection indicator is secured in movement to the disconnection system and the disconnection indicator and the insulating body are arranged to have a first configuration, which corresponds to the contact position, and a second configuration, which corresponds to the open position, the relative positioning of the disconnection indicator with respect to the insulating body in the first configuration being visually distinct from the outside of the insulating body from the relative positioning of the disconnection indicator with respect to the insulating body in the second configuration.

14 Claims, 3 Drawing Sheets

(51) Int. Cl.
| | |
|---|---|
| *H01C 7/12* | (2006.01) |
| *H01H 37/08* | (2006.01) |
| *H01H 37/76* | (2006.01) |
| *H02H 3/22* | (2006.01) |

(52) U.S. Cl.
CPC ............ *H01H 37/761* (2013.01); *H02H 3/22* (2013.01); *H01H 2037/762* (2013.01)

(58) Field of Classification Search
USPC ........................................................ 361/118
See application file for complete search history.

(56) References Cited

U.S. PATENT DOCUMENTS

| | | | | |
|---|---|---|---|---|
| 2013/0083441 | A1* | 4/2013 | Higashi | G01R 31/1236 361/57 |
| 2013/0106567 | A1* | 5/2013 | Depping | H01C 7/12 338/260 |

\* cited by examiner

DISCONNECTION INDICATOR OF AN ACTIVE COMPONENT OF A DEVICE FOR PROTECTING AN ELECTRICAL INSTALLATION

CROSS REFERENCE TO RELATED APPLICATION

This application is related to and claims the benefit of European Patent Application Number 14/55681 filed on 20 Jun. 2014, the contents of which are herein incorporated by reference in their entirety.

TECHNICAL FIELD

The present invention relates to a device for protecting an electrical installation comprising a system for disconnecting an active component of the device with visual indicator.

BACKGROUND

A varistor is an active component of a device for protecting an electrical installation, such as a lightning arrester. Current varistors, or variable resistors comprise a ceramic block for example composed of zinc oxide assembled by sintering and have a non-linear current/voltage characteristic: beyond a certain voltage threshold, the varistor impedance drops to allow the discharge of current following a voltage surge. When the voltage returns to its normal level, the varistor impedance assumes its value at the standby state.

In a lightning arrester, one or several varistors are generally disposed in a cartridge also comprising a connection element, allowing to electrically connect them to the electrical installation to be protected.

In order to prevent damage due to malfunctions and to abnormal heating phenomena of the varistors, the latter must be fitted with a disconnection system. This leads for a need to equip lightening arresters with systems for indicating a connected or disconnected state of the varistors.

It is known to use indication systems comprising electrical lights mounted in parallel on the varistors. The use of electrical lights leads to permanent energy consumption.

It is also known to use mechanical indication systems requiring the use of several expensive and bulky pieces which lead to a blocking risk of the mechanism.

BRIEF SUMMARY

The disclosure resolves all or part of the aforementioned drawbacks.

To this end, the present disclosure relates to a device for protecting an electrical installation comprising an insulating body electrically defining an internal housing, the protective device comprising a first joining element and a second joining element intended for joining the protective device to the electrical installation, and comprising, within the internal housing:
  a first portion of the electrical circuit connected to the first joining element and a second portion of the electrical circuit connected the second joining element;
  a varistor comprising a first terminal electrically connected to the first portion of the electrical circuit and a second terminal;
  a disconnection system for disconnecting the varistor comprising a connection element arranged for electrically connecting the second terminal of the varistor to the second portion of the electrical circuit, the connection element comprising a moveable part capable of occupying a contact position in which the connection element is electrically connected to the second terminal of the varistor, and an open position in which the connection element is electrically insulated from the second terminal of the varistor;
  a disconnection indicator;
  characterized in that the disconnection indicator is secured in movement to the moveable part of the connection element, and in that the disconnection indicator and the insulating body are arranged to have a first configuration, which corresponds to the contact position of the moveable part of the connection element, and a second configuration, which corresponds to the open position of the moveable part of the connection element, the relative positioning of the disconnection indicator with respect to the insulating body in the first configuration being visually distinct from the outside of the insulating body from the relative positioning of the disconnection indicator with respect to the insulating body in the second configuration.

According to one aspect of the invention, there is no relative movement between the disconnection indicator and the moveable part of the connection element.

Thanks to the dispositions according to the invention, the indicator of the connected or disconnected state of the active component is integrated to the disconnection system and thus has a limited size. In addition, no friction is caused by the passage of the moveable part of the connection element, and hence of the disconnection indicator, from the contact position to the closed position. Thus, the wear of the materials as well as the risks of blocking due to this movement are limited. Finally, this type of indicator does not cause any additional energy consumption.

According to optional features of the device for protecting an electrical installation:
  the protective device comprises an electrically insulating mounting portion comprising a reception housing for receiving the connection element and secured in movement to the connection element;
  the mounting portion comprises a moveable part arranged for accommodating the moveable part of the connection element;
  the disconnection indicator is formed of a single piece with the mounting portion, the disconnection indicator is thus secured to the mounting portion, and is hence secured in movement to the connection element;
  the connection element is deformable;
  the mounting portion is deformable;
  a return element allows the passage of the moveable part of the connection element from the contact position to the open position;
  the return element is a spring;
  in the contact position, the moveable part of the connection element is mechanically fixed to the second terminal of the varistor;
  the mechanical fixing of the moveable part of the connection element to the second terminal of the varistor is ensured by brazing a retaining element;
  the retaining element can melt from a threshold temperature, the threshold temperature corresponds to a temperature of abnormal heating of the varistor;
  when the varistor reaches the threshold temperature, the retaining element melts and the return element moves the moveable part the connection element from the contact position to the open position;

the insulating body comprises a viewing portion disposed facing the disconnection indicator, allowing the operator to know the position of the moveable part of the connection element;

the disconnection indicator comprises a first portion visible from the outside of the insulating body in the first configuration and a second portion visible from the outside of the insulating body in the second configuration, the first portion and the second portion being visually distinct;

the first portion and the second portion of the disconnection indicator have different colors, allowing the operator to distinguish between the contact position and the open position;

the first portion of the disconnection indicator is at the viewing portion in the first configuration and the second portion of the disconnection indicator is at the viewing portion in the second configuration;

the viewing portion is an opening in the insulating body;

the viewing portion is a transparent portion of the insulating body;

the connection element is electrically connected to the second portion of the electrical circuit;

the connection element comprises a stationary part at which it is connected to the second portion of the electrical circuit;

the insulating body comprises a rear face intended to be mounted on a support and a front face, opposite the rear face, the front and rear faces defining an internal housing along the first extension direction;

the varistor and the disconnection system being disposed in the internal housing of the insulating body, aligned along a second extension direction of the internal housing, transverse to the first extension direction, a transverse extension direction meaning, an extension direction oriented according to an angle between 60° and 120° with respect to the first extension direction;

preferably, the second extension direction is oriented according to an angle between 70° and 110° with respect to the first extension direction;

preferably, the second extension direction is oriented according to an angle between 80° and 100° with respect to the first extension direction;

preferably, the second extension direction is oriented perpendicularly to the first extension direction;

the varistor and the disconnection system are disposed in the internal housing of the insulating body aligned along the second extension direction;

a face of the insulating body delimits the insulating body in the second extension direction and is intended to form a lower face of the protective device when the latter is disposed on a substantially vertical support, in such a manner that the second extension direction be substantially vertical;

the first portion of the electrical circuit and the second portion of the electrical circuit extend along the second extension direction in the internal housing of the insulating body;

the first portion of the electrical circuit and the second portion of the electrical circuit extend facing the rear face of the insulating body;

the lower face comprises a first opening in which the first joining element is capable of being inserted, and a second opening in which the second joining element is capable of being inserted;

the insulating body comprises a solid upper face, opposite the lower face;

the insulating body comprises two solid lateral faces, opposite to one another;

the insulating body is substantially parallelepiped;

the insulating body is formed of two half shells brought onto one on another;

a contact zone of the half shells sealingly crosses the upper face;

the first and second joining elements are adjacent to one another;

the first and second joining element correspond, indifferently to the phase and the neutral;

the first and second conductive elements are conductive wires with screws;

the first and the second conductive elements are output terminals with screws;

the protective device comprises a third joining elements;

the third joining elements corresponds to neutral;

the third joining elements comprises a conductive element;

the conductive element is a conductive wire with screws;

the conductive element is an output terminal with screws;

the lower face of the insulating body comprises a third opening in which the third joining elements can be inserted;

the first, second and third joining elements are disposed on a same face of the insulating body;

the varistor comprises a first electrical joining lug, a second electrical joining lug and an active body comprising a first face and a second face;

the first face and the second face of the varistor are opposite each other;

the first and the second joining lugs each comprise a conductive path electrically connected to the active body the varistor;

the first connecting lug comprises a first portion extending facing the first face of the active body and a second portion electrically connected to the first portion of the electrical circuit;

the second joining lug comprises a first portion extending facing the second face of the active body, electrically connected to the connection element electrically connected to the second portion of the electrical circuit, and a second portion at a distance from the first portion and second portion of electrical circuit;

the device comprises an electrically insulating mounting element comprising the mounting portion comprising a housing for receiving the connection element and a second mounting portion comprising a housing for receiving the varistor;

the second mounting portion is formed of a same piece with the mounting portion comprising a housing for receiving the connection element;

the return element is disposed between the mounting portion accommodating the connection element and the second mounting portion;

the second mounting portion comprises a housing for receiving the second portion of the second connecting lug;

the active body of the varistor, the first joining lug and the second connecting lug are covered with an electrically insulating coating;

the insulating coating comprises a first opening at the second portion of the first joining lug, and a second opening at the second portion of the second joining lug;

the second portion of the first joining lug is electrically connected to the first portion of the electrical circuit at the first opening, which constitutes the first terminal of the varistor;

the second portion of the first joining lug extends along the first extension direction;

the second portion of the second joining lug extends along the second extension direction, transverse to the first extension direction;

the coating comprises a third opening at the first portion of the second joining lug;

the first portion of the second joining lug is connected to the disconnection system at the third opening, which constitutes the second terminal of the varistor;

the second portion of the first joining lug extends along the first extension direction;

the second portion of the second joining lug extends along the second extension direction.

BRIEF DESCRIPTION OF THE DRAWINGS

Other features and advantages of the present invention will become apparent in light of the following description and by examining the accompanying figures, in which.

On all these figures, identical or similar references designate identical or similar members or assemblies of members.

DETAILED DESCRIPTION

Figure 1:
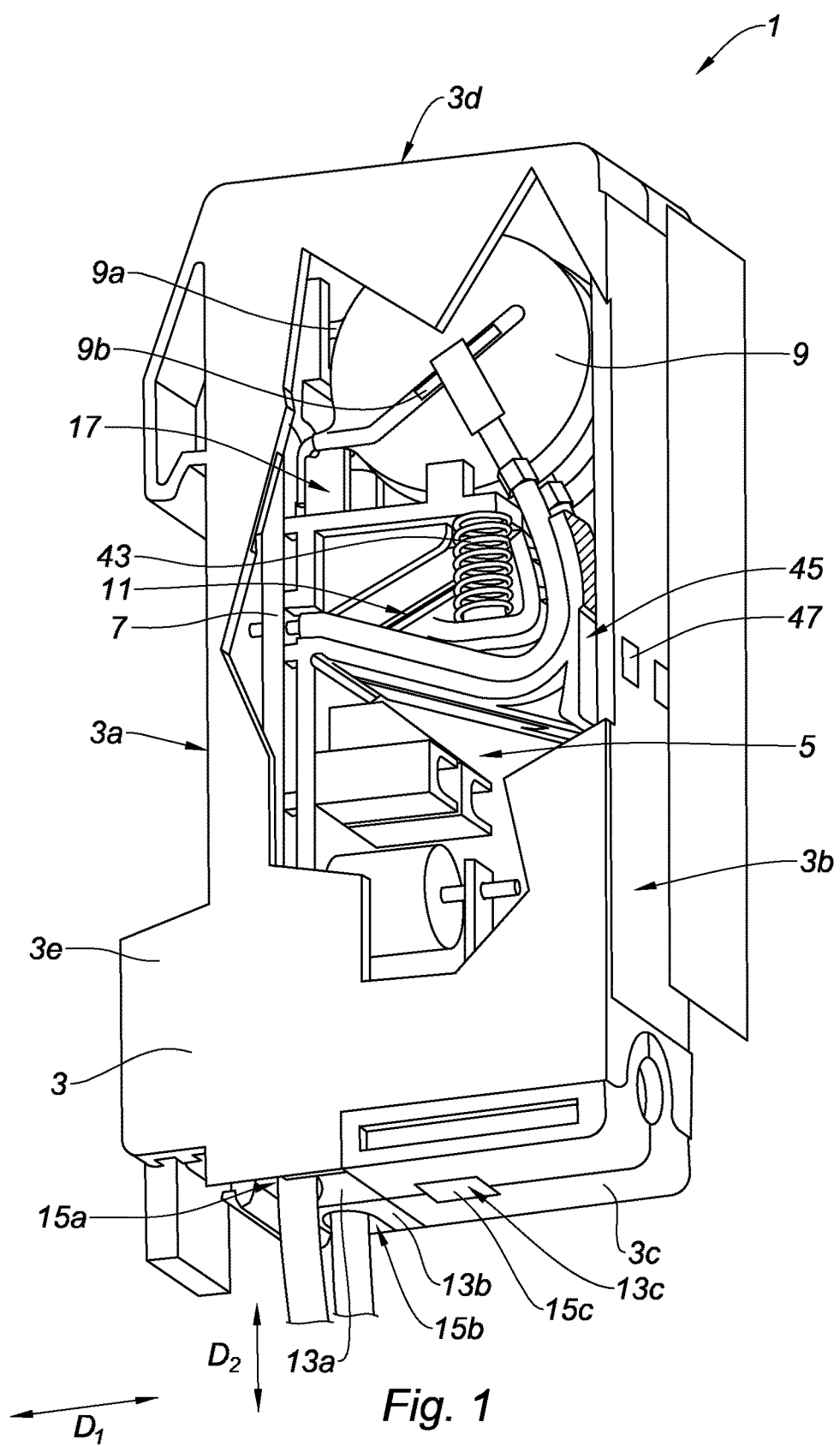
FIG. 1 represents a device for protecting an electrical installation in a cutaway view.

FIG. 1 represents a device 1 for protecting an electrical installation intended to be added onto a support (not represented), for example a DIN type rail, within an electrical box along a substantially vertical direction. The protective device 1 comprises an electrically insulating body 3, substantially parallelepiped. The insulating body 3 comprises a rear face 3a intended to be fixed onto the support. The insulating body 3 further comprises a front face 3b opposite the rear face 3a, visually accessible when the device is added onto the support. The front 3b and rear 3a faces define an internal housing 5 along an extension direction D1. The insulating body comprises a face 3c, destined to be the lower face of the insulating body 3 when the protective device 1 is added onto the support, that is to say, during operation. A face 3d, solid and opposite the face 3c is intended to be the upper face of the insulating body 3 when the protective device 1 is added onto the support. The faces 3c and 3d define a second extension direction D2. The second extension direction D2 is substantially perpendicular to the first extension direction D1. The insulating body 3 further comprises faces 3e, solid and opposite to one another.

Figure 2:
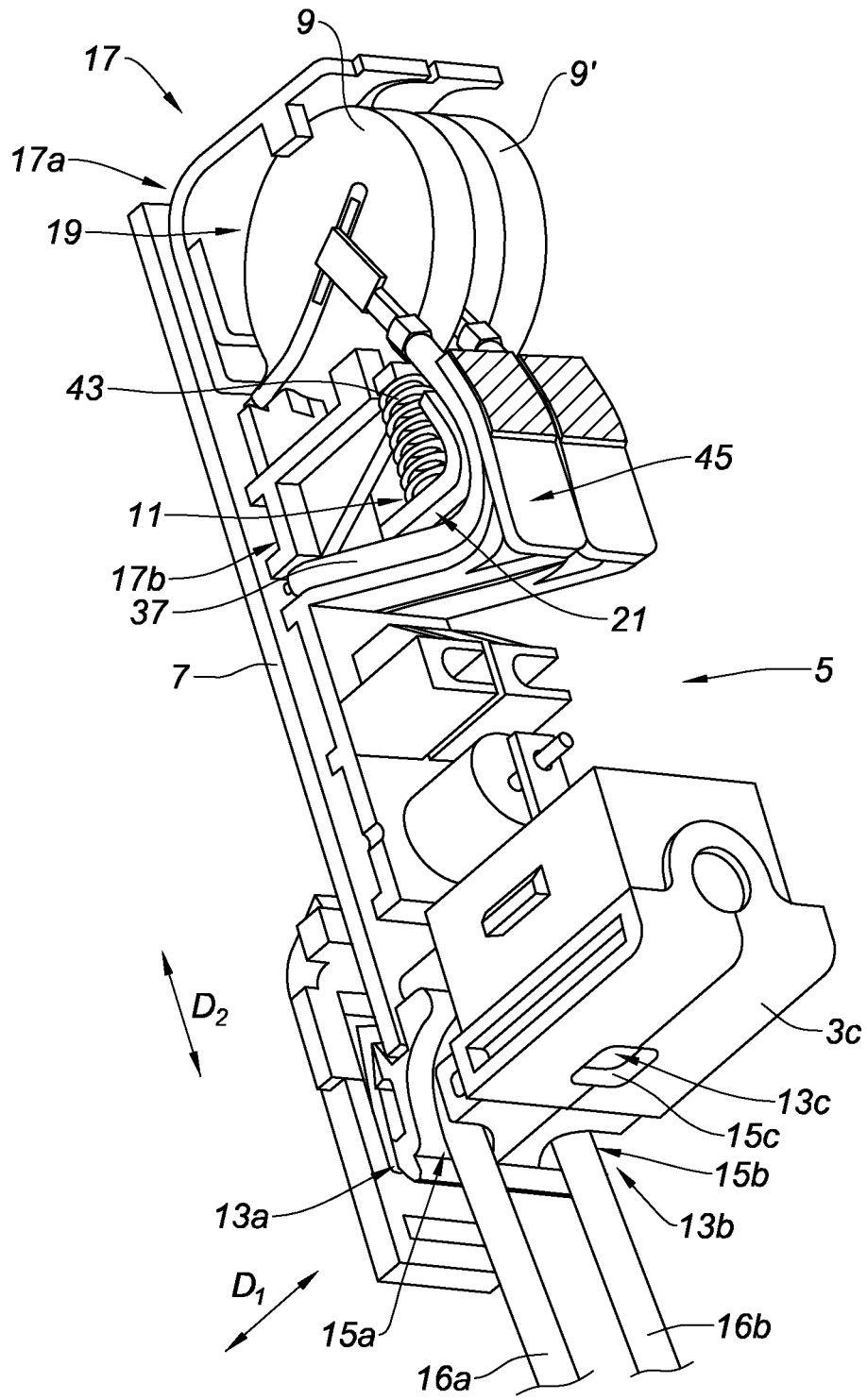
FIG. 2 represents the elements disposed in the internal housing of the insulating body.
Figure 3:
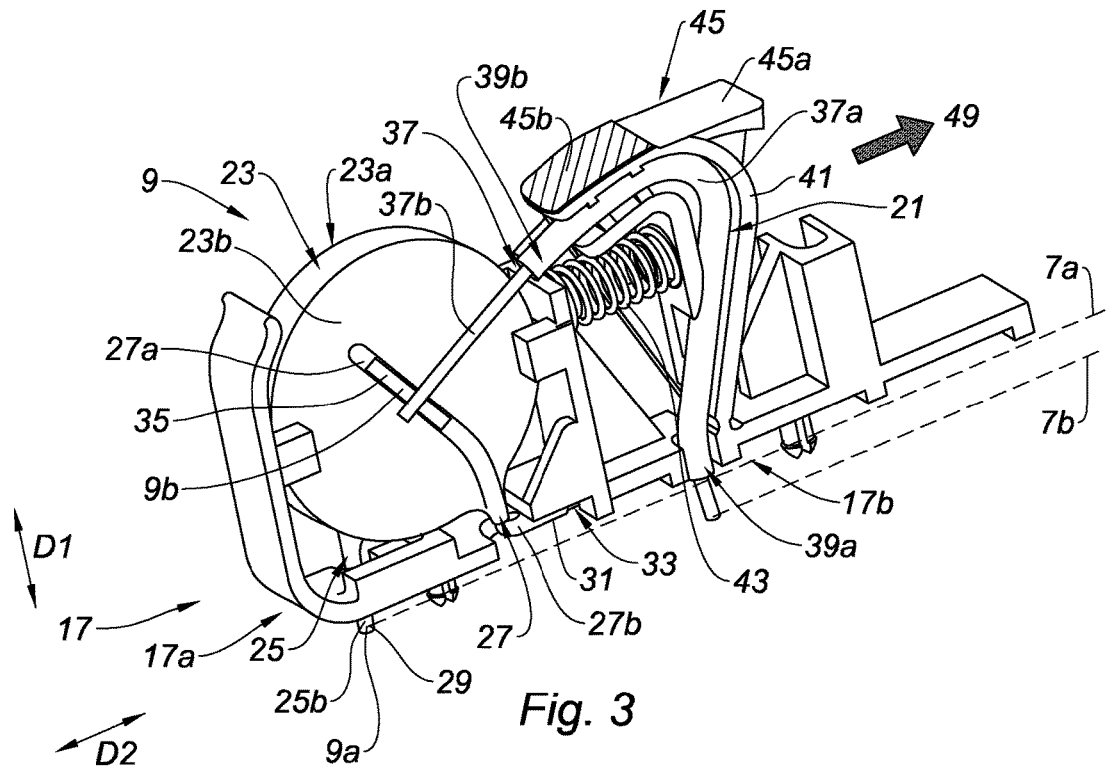
FIG. 3 represents a varistor and a disconnection system in the contact position.
Figure 4:
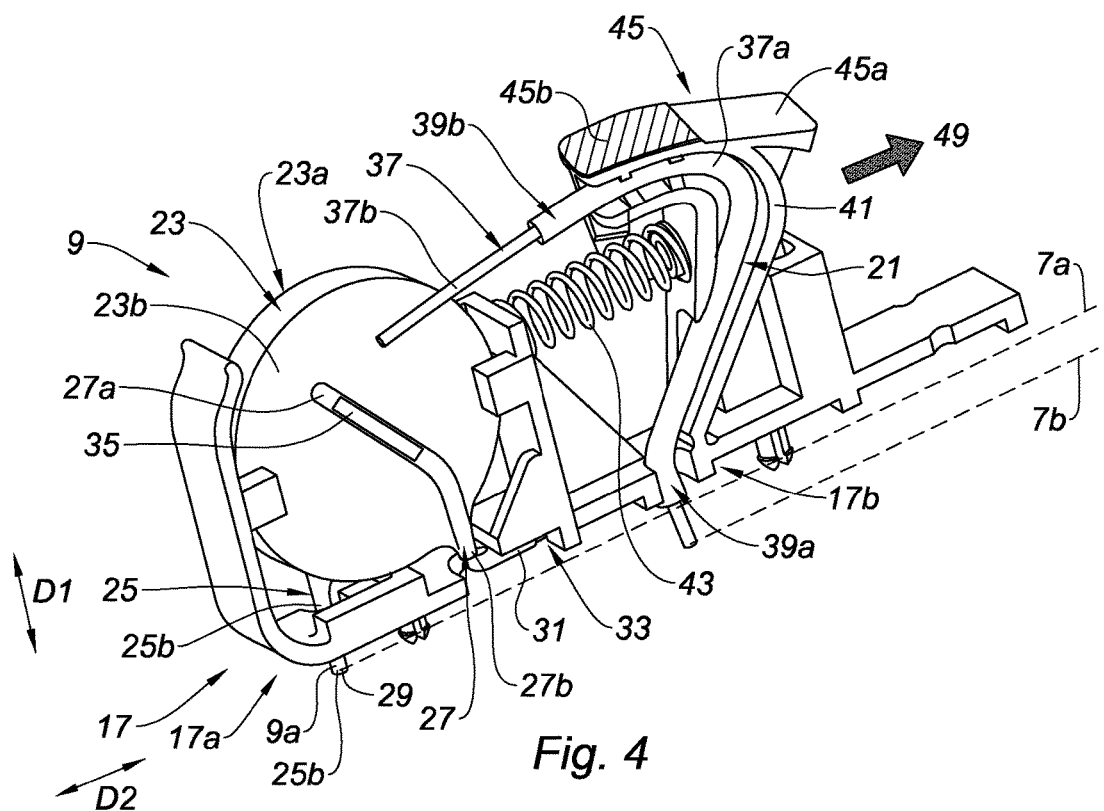
FIG. 4 represents a varistor and a disconnection system in the open position.

As represented in FIG. 2, the internal housing 5 comprises a printed circuit 7 including two portions of electrical circuit or conductive paths 7a, 7b, represented on FIGS. 3 and 4. The internal housing 5 further comprises an active component, here a varistor electrically connected to a disconnection system 11. A first conductive path 7a is electrically connected to the varistor 9 and a second conductive path 7b is electrically connected to the disconnection system 11. The conductive paths 7a, 7b are each further electrically connected to a joining element 13a, 13b and 13c of the protective device 1 to the main circuit of the electrical installation to be protected.

The internal housing 5 here comprises, a second varistor 9' coupled to a second disconnection system (not represented), having a disposition and operation identical to the varistor 9 coupled to the disconnection system 11.

The varistor 9 and the disconnection system 11 are disposed in an aligned manner in the internal housing 5 along the second extension direction D2 of the internal housing 5. The printed circuit 7 is oriented along the second extension direction D2. The printed circuit 7 runs along the length of the varistor 9 and the disconnection system 11. Thus, the connection of the varistor 9 and disconnection system 11 to the conductive paths 7a, 7b is facilitated.

The joining elements 13a, 13b are adjacent to one another. The face 3c comprises a first insertion opening 15a in which the joining element 13a is suitable to be inserted. The joining element 13a comprises a conductive element, here a conductive wire with screws 16a. The face 3c further comprises a second insertion opening 15b in which the joining element 13b is suitable to be inserted. The joining element 13b comprises a conductive element, here a conductive wire with screws 16b. The conductive wires 16a and 16b are attached to the phase and the neutral. The face 3c further comprises an opening 15c, in which the joining element 13c is suitable to be inserted here having the shape of an output terminal with screws, attached to the ground. The conductive wires 16a and 16b, and the output terminal are then joined to the printed circuit 3. The connecting of the conductive wires 16a and 16b and the output terminal is, for example, achieved by welding on the printed circuit 3, at the conductive paths.

These insertion openings 15a, 15b are disposed on the face 3c of the insulating body 3.

The insulating body 3 comprises two half shells added onto each other at a contact zone. The contact zone sealingly crosses the face 3d. Thus, in case of bad weather or condensation, water mainly flows on the upper 3d and lateral 3a, 3b, 3e faces of the insulating body 3. The risk of water infiltrating inside the protective device 1 is thus reduced.

The internal housing 5 of the insulating body 3 further comprises an electrically insulating mounting element 17 including a first mounting portion 17a and a second mounting portion 17b, formed of a same piece. The first mounting portion 17a comprises a reception housing 19 arranged for accommodating the varistor 9. The second mounting portion 17b comprises a reception housing 21 arranged for accommodating the disconnection system 11. The mounting element 17 thus allows the insulation of the varistor 9, the disconnection system 11 and the printed circuit 7 with respect to one another. It is thus possible to bring these elements closer to one another without risking unwanted electrical connection. This arrangement of elements within the internal housing 5 of the insulating body 3 thus allows reducing the size of the protective device 1.

As it is also represented in FIGS. 3 and 4, the varistor 9 comprises an active body comprising a ceramic block, here having the shape of a pellet 23. The varistor 9 further comprises a first joining lug 25 and a second joining lug 27, electrically connected to the pellet 23. The pellet 23 comprises a first main face 23a and a second main face 23b, opposite to the first main face 23a. The connecting lugs 25, 27 each comprise a portion extending facing one of the main faces of the pellet 23. For example, the connecting lug 27 comprises a portion 27a disposed facing the second main face 23b of the pellet 23. The pellet 23 and the connecting lugs 25, 27 are covered with an insulating coating. The connecting lug 25 comprises an end portion 25b and the connecting lug 27 comprises an end portion 27b. The insulating coating comprises a first opening 29 at the end portion 25b of the connecting lug 25. The insulating coating comprises a second opening 31 at the end portion 27b of the connecting lug 27. The end portions 25b and 27b hence each comprise a conductive portion at the openings 29, 31 respectively.

The conductive portion of the connecting lug 25 constitutes a first terminal 9a of the varistor 9, which allows connecting the varistor 9 to the first conductive path of the printed circuit 7. The end portion 25b extends along the extension direction D1 and is substantially perpendicular to the printed circuit 7, extending along the extension direction D2.

The conductive portion of the connecting lug 27 is located at a distance from the printed circuit 7 and is hence directly isolated from the latter. The end portion 27b extends along the direction D2, it is thus substantially perpendicular to the end portion 12b and substantially parallel to the printed circuit 7. The end portion 27b is disposed in a housing 33 for receiving the first mounting portion 17a.

On the second main face 23b of the pellet 23, the insulating coating comprises a third opening 35 at the portion 27a of the connecting lug 27. The portion 27a thus comprises a conductive portion at the opening 35. The conductive portion constitutes a second terminal 9b of the varistor 9 by which the varistor 9 can be electrically connected to the disconnection system 11.

These dispositions allow for example using standard varistors, from a store.

The disconnection device 11 comprises a connection element, here constituted by a conductive wire 37. According to another embodiment of the invention, the connection element may for example be constituted of a thin conductive blade. The conductive wire 37 comprises a stationary part 39a at which it is electrically connected to the second conductive path 7b of the printed circuit 7. The conductive wire 37 is hence able to electrically connect said second terminal 9b of the varistor 9 to the printed circuit 7. A portion 37a of the conductive wire 37 is covered by a protective insulating coating. The conductive wire 37 comprises a moveable portion 39b. The second mounting portion 17b comprises a housing for receiving the conductive wire 37. The second mounting portion 17b is secured in movement to the thread 37 and comprises a moveable part 41, accommodating the moveable part 39b of the conductive wire 37. The moveable parts 39b, 41 of the conductive wire 37 and the second mounting portion 17b are deformable between a contact position and an open position. The friction phenomena due to the passage of the moveable parts 39b, 41 the conductive wire 37 and of the second mounting portion 17b from the contact position to the open position are hence limited.

An elastic return element, here a spring 43 is disposed between the second mounting portion 17b and the first mounting portion 17a and is capable of moving the moveable parts 39b, 41 of the conductive wire 37 and of the second mounting portion 17b.

A disconnection indicator 45 is formed of a single piece with the mounting element 17. The disconnection indicator 45 is located at the moveable part 41 of the second mounting portion 17b. The disconnection indicator 45 is thus also moveable between the contact position and the open position. The disconnection indicator 45 comprises two visually distinct portions: a first uncolored portion 45a and a second colored portion 45b.

The insulating body 3 comprises a viewing portion at its front face 3a, here an opening 47 allowing to view from the outside, one of the portions 45a, 45b of the disconnection indicator 45 facing the opening 47.

In the contact position represented in FIGS. 1, 2 and 3, the conductive wire 37 is electrically connected to the second terminal 9b of the varistor 9. The spring 43 is compressed and exerts a stress in a direction indicated by the arrow 49. In order to maintain the position of the moveable parts 39b, 41 of the conductive wire 37 and of the second mounting portion 17b, a retaining element allows fixing an end portion 37b of the conductive wire 37 to the second terminal 9b of the varistor 9. The retaining element is a solder. The solder is selected from a material capable of melting from a threshold temperature, corresponding to an abnormal overheating temperature of the varistor 9. As represented on FIG. 1, in contact position, the uncolored portion 45a of the disconnection indicator 45 is located at the opening 47 of the insulating body 3. This uncolored portion 45a is visible from the outside of the insulating body 3 and indicates to an operator the connected state of the varistor 9.

In an open position, represented on FIG. 4, the conductive wire 37 is isolated from the second terminal 9b of the varistor 9. The spring 43 is released. The solder is melted. In this position, the colored portion 45b of the disconnection indicator 45 is located at the opening 47 of the insulating body 3. The colored portion 45b is visible from the outside of the insulating body 3 and indicates to an operator the disconnected state of the varistor 9.

During an abnormal heating of the varistor 9, the intrinsic temperature of the varistor 9 reaches a temperature that is higher than or equal to the threshold temperature from which the solder is capable of melting. Thus, the solder melts, the spring 43 is released and allows a displacement along the direction 49 of the moveable parts 39b, 41 of the conductive wire 37 and the second mounting portion 17b, as well as the disconnection indicator 45. The colored portion 45b of the disconnection indicator 45 is hence located at the opening 47 of the insulating body 3.

The second varistor 9' identically cooperates with identical elements. Obviously, the present invention is not limited to the described and represented embodiment, provided by way of illustrating and non-limiting example.

According to one embodiment, the disconnection indicator 45 could be independent from the second mounting portion 17b while remaining secured in movement to the moveable part 39b of the conductive wire 37.

According to one embodiment, the viewing portion of the insulating body 3 may be constituted by a transparent portion, thus revealing the disconnection indicator 45 from the outside, and ensuring the sealing of device.

According to one embodiment, the joining elements may comprise output terminals with screws for the phase, the neutral and the ground.

According to one embodiment, the joining elements may comprise conductive output wires with screws for the phase, the neutral and the ground.

The invention claimed is:

1. A device for protecting an electrical installation comprising an insulating body electrically defining an internal housing, the protective device comprising a first joining element and a second joining element intended for joining the protective device to the electrical installation, and comprising, within the internal housing:

a first portion of the electrical circuit connected to the first joining element and a second portion of the electrical circuit connected the second joining element;

a varistor comprising a first terminal electrically connected to the first portion of the electrical circuit and a second terminal;

a disconnection system for disconnecting the varistor comprising a connection element arranged for electrically connecting the second terminal of the varistor to the second portion of the electrical circuit, the connection element comprising a moveable part capable of occupying a contact position in which the connection element is electrically connected to the second terminal of the varistor, and an open position in which the connection element is electrically isolated from the second terminal of the varistor;

a disconnection indicator;

wherein the disconnection indicator is secured in movement to the moveable part of the connection element, and in that the disconnection indicator and the insulating body are arranged to have a first configuration, which corresponds to the contact position of the moveable part of the connection element, and a second configuration, which corresponds to the open position of the moveable part of the connection element, the relative positioning of the disconnection indicator with respect to the insulating body in the first configuration being visually distinct from the outside of the insulating body from the relative positioning of the disconnection indicator with respect to the insulating body in the second configuration.

2. The device for protecting an electrical installation according to claim 1, wherein the protective device comprises an electrically insulating mounting portion comprising a reception housing for receiving the connection element and secured in movement to the connection element.

3. The device for protecting an electrical installation according to claim 2, wherein the disconnection indicator is formed of a single piece with the mounting portion.

4. The device for protecting an electrical installation according to claim 1, wherein the connection element is deformable.

5. The device for protecting an electrical installation according to claim 2, wherein the mounting portion is deformable.

6. The device for protecting an electrical installation according to claim 1, wherein a return element allows the passage of the moveable part of the connection element from the contact position to the open position.

7. The device for protecting an electrical installation according to claim 1, wherein, in the contact position, the moveable part of the connection element is mechanically fixed to the second terminal of the varistor.

8. The device for protecting an electrical installation according to claim 7, wherein the mechanical fixing of the moveable part of the connection element to the second terminal of the varistor is ensured by brazing a retaining element.

9. The device for protecting an electrical installation according to claim 8, wherein the retaining element is capable of melting from a threshold temperature.

10. The device for protecting an electrical installation according to claim 1, wherein the insulating body comprises a viewing portion disposed facing the disconnection indicator.

11. The device for protecting an electrical installation according to claim 1, wherein the disconnection indicator comprises a first portion visible from the outside of the insulating body in the first configuration and a second portion visible from the outside of the insulating body in the second configuration, the first portion and the second portion being visually distinct.

12. The device for protecting an electrical installation according to claim 10, wherein the first portion of the disconnection indicator is at the viewing portion in the first configuration and the second portion of the disconnection indicator is at the viewing portion in the second configuration.

13. The device for protecting an electrical installation according to claim 10, wherein the viewing portion is an opening in the insulating body.

14. The device for protecting an electrical installation according to claim 10, wherein the viewing portion is a transparent portion of the insulating body.

* * * * *